US008651442B2

(12) United States Patent
Takaya et al.

(10) Patent No.: US 8,651,442 B2
(45) Date of Patent: Feb. 18, 2014

(54) RAIL ATTACHMENT STRUCTURE OF ELECTRIC DEVICE

(75) Inventors: Kouetsu Takaya, Kounosu (JP); Koji Okubo, Kounosu (JP); Yasuhiro Naka, Kounosu (JP); Kenji Suzuki, Kounosu (JP)

(73) Assignee: Fuji Electric FA Components & Systems Co., Ltd., Tokyo (JP)

( * ) Notice: Subject to any disclaimer, the term of this patent is extended or adjusted under 35 U.S.C. 154(b) by 0 days.

(21) Appl. No.: 13/322,018

(22) PCT Filed: Jun. 14, 2010

(86) PCT No.: PCT/JP2010/003937
§ 371 (c)(1),
(2), (4) Date: Jan. 10, 2012

(87) PCT Pub. No.: WO2011/021335
PCT Pub. Date: Feb. 24, 2011

(65) Prior Publication Data
US 2012/0138759 A1 Jun. 7, 2012

(30) Foreign Application Priority Data

Aug. 20, 2009 (JP) .................. 2009-190588

(51) Int. Cl.
| | | |
|---|---|---|
| A47B 96/00 | (2006.01) |
| A47K 1/00 | (2006.01) |
| A47K 5/00 | (2006.01) |
| F16L 3/08 | (2006.01) |
| F21V 21/00 | (2006.01) |
| F21V 35/00 | (2006.01) |
| A47B 96/06 | (2006.01) |
| E04G 3/00 | (2006.01) |
| F16B 1/00 | (2006.01) |
| G09F 7/18 | (2006.01) |
| A47G 29/00 | (2006.01) |
| F16M 11/00 | (2006.01) |
| H01R 13/60 | (2006.01) |
| H01R 13/66 | (2006.01) |

(52) U.S. Cl.
USPC ............... 248/225.21; 248/227.1; 248/228.1; 248/228.7; 248/694; 439/532

(58) Field of Classification Search
USPC ............ 248/220.21, 221.11, 222.11, 223.41, 248/225.21, 225.11, 227.1, 229.24, 229.26, 248/231.81; 292/1, 80, 81, DIG. 53, 292/DIG. 54, DIG. 61; 174/535, 541; 361/732, 733, 809, 679.01, 361/679.33–679.39, 679.41, 724–727, 683
IPC ................................................ H05K 5/02,7/12
See application file for complete search history.

(56) References Cited

U.S. PATENT DOCUMENTS 5,121,893 A * 6/1992 King et al. .................... 248/251
(Continued)

FOREIGN PATENT DOCUMENTS

JP U S54-179457 12/1979
(Continued)

*Primary Examiner* — Daniel J Troy
*Assistant Examiner* — Muhammad Ijaz
(74) *Attorney, Agent, or Firm* — Manubu Kanesaka

(57) ABSTRACT

First fitting portions (9a and 9b) and second fitting portions (9c and 9d) are arranged in a hook shape on the bottom (3a) of a housing to face each other. The first fitting portions are fittingly engaged to one rail edge (2a) of a rail (2) in the width direction and the second fitting portions are fittingly engaged to the other rail edge (2b) of the rail. A linear spring (10) bent in a mountain shape is disposed on the bottom of the housing. The linear spring elastically deforms to reduce the inclination angle of the mountain by contacting the end surface of the one rail edge engaged to the first fitting portions. The urging force of the linear spring urges the rail such that the other rail edge is pressed by the second fitting portions.

4 Claims, 5 Drawing Sheets

(56) References Cited

U.S. PATENT DOCUMENTS

| | | | |
|---|---|---|---|
| 6,120,000 A * | 9/2000 | Aeschbach et al. | 248/694 |
| 6,540,187 B2 * | 4/2003 | Carter | 248/251 |
| 7,980,891 B2 * | 7/2011 | Molnar | 439/532 |
| 8,066,239 B2 * | 11/2011 | Molnar et al. | 248/214 |
| 2008/0299820 A1 * | 12/2008 | Schelonka et al. | 439/532 |
| 2010/0216334 A1 * | 8/2010 | Christmann et al. | 439/532 |

FOREIGN PATENT DOCUMENTS

| | | |
|---|---|---|
| JP | U S61-62504 | 4/1986 |
| JP | U S62-188035 | 11/1987 |
| JP | H11-233969 | 8/1999 |

* cited by examiner

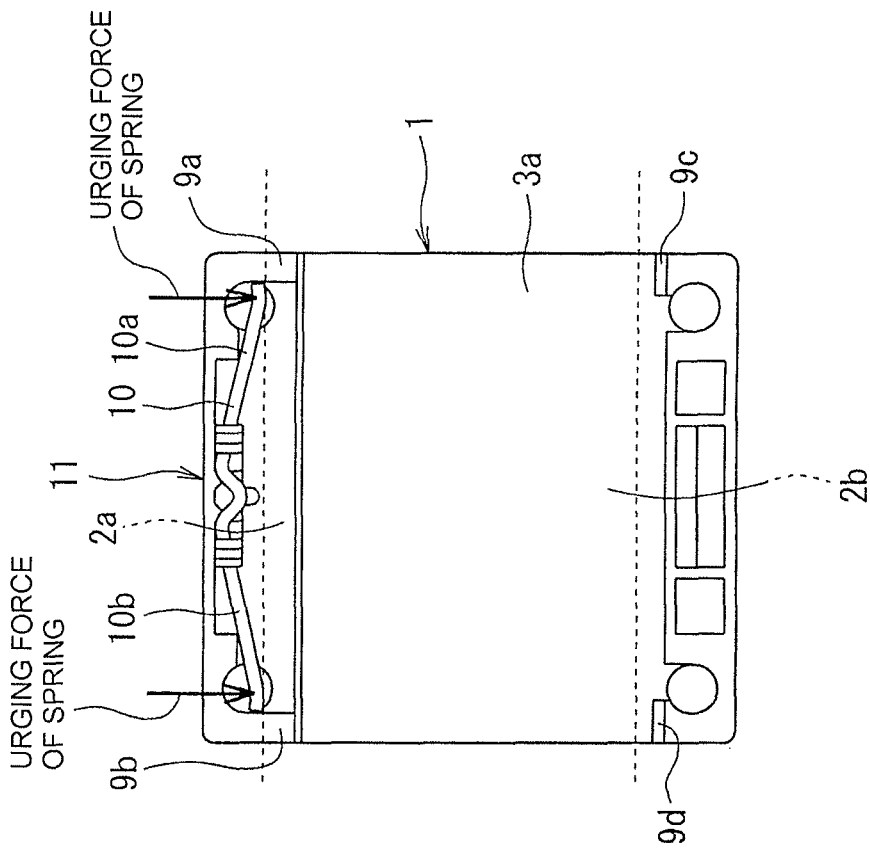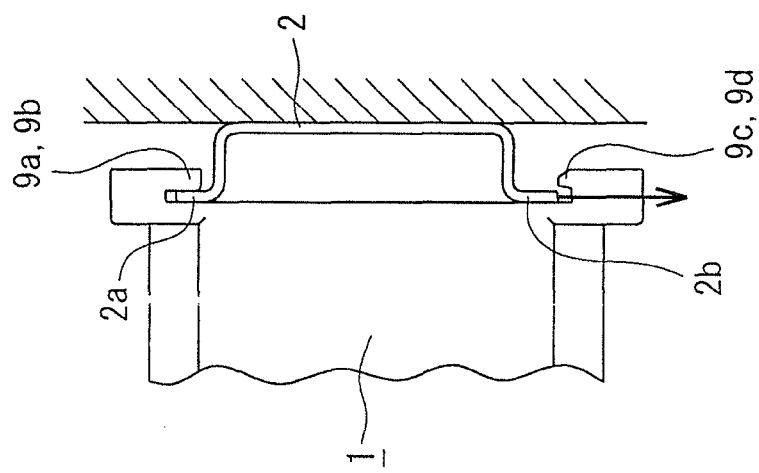

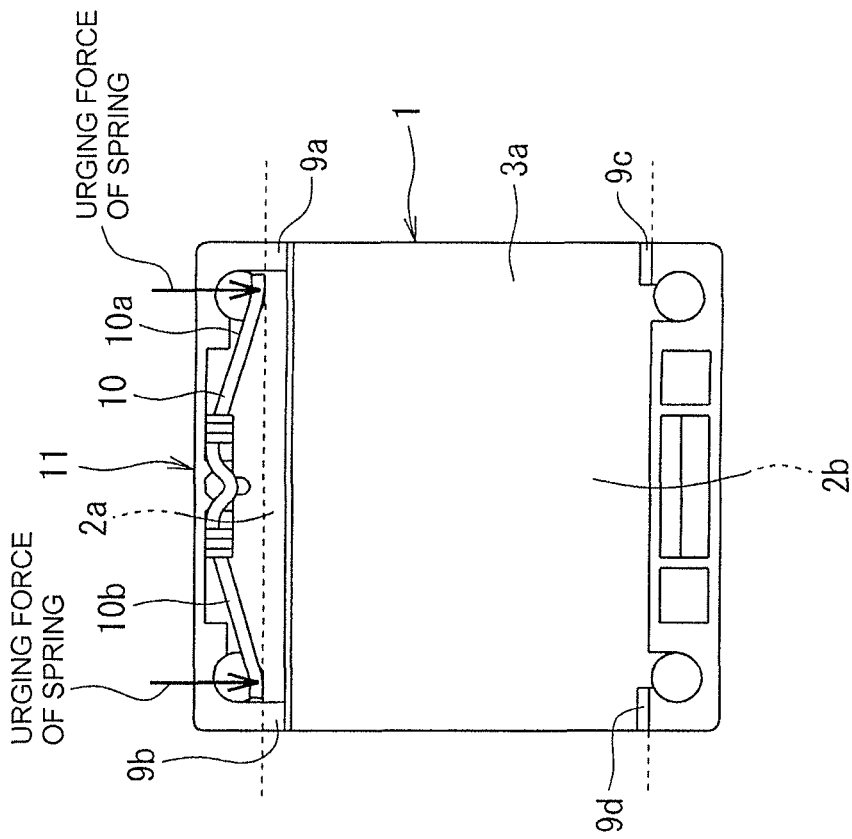
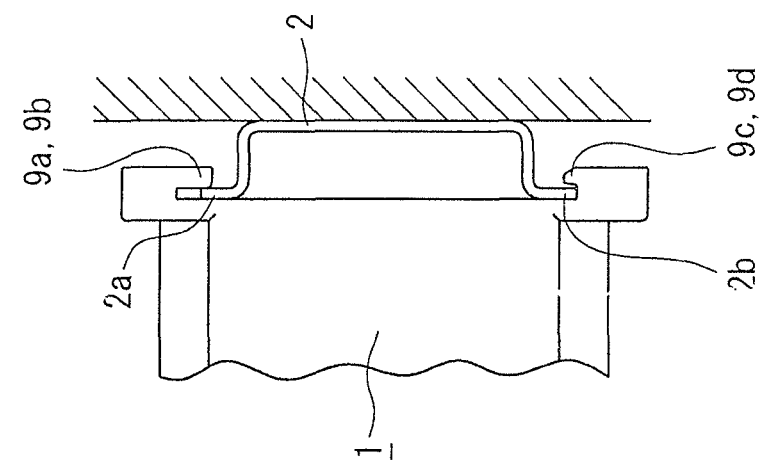

RAIL ATTACHMENT STRUCTURE OF ELECTRIC DEVICE

RELATED APPLICATIONS

The present application is National Phase of International Application No. PCT/JP2010/003937 filed Jun. 14, 2010, and claims priority from, Japanese Application No. 2009-190588, filed Aug. 20, 2009.

TECHNICAL FIELD

The present invention relates to a rail attachment structure of an electric device for attaching an electric device, such as a wiring circuit breaker and an electromagnetic contactor, to a rail provided in, for example, a distributing board.

BACKGROUND ART

In order to attach an electric device to a rail, a structure has been proposed in which a fixing claw is integrally formed on one side of the bottom of a housing of the electric device, a movable claw removably engaged to the side surface of the housing is provided at a position facing the fixing claw of the bottom of the housing, wherein the fixing claw is engaged to one edge of the rail, and the movable claw is engaged to the other edge of the rail, thereby attaching the electric device to the rail (for example, Patent Document 1).

CITATION LIST

Patent Document

Patent Document 1: Japanese Patent Application Laid-Open (JP-A) No. 62-188035

DISCLOSURE OF INVENTION

Problems to be Solved By the Invention

However, the attachment structure according to the related art has the following problems in terms of manufacturing costs.

That is, since the movable claw is provided on the side surface of the housing, the number of components increases, the structure becomes complicated, and the number of assembly processes including a manual process of assembling the movable claw increases, which results in an increase in manufacturing costs.

In addition, when the electric device is detached from the rail, a tool is needed to remove the movable claw, and thus, the handling of the movable claw is problematic.

The invention has been made in view of the above-mentioned problems and an object of the invention is to provide a rail attachment structure of an electric device capable of simply attaching an electric device to a rail with a small number of components and a small number of assembly processes and detaching the electric device from the rail without using a tool.

Means for Solving the Problems

In order to achieve the object, the present embodiment provides a rail attachment structure of an electric device for attaching an electric device to a rail. The rail attachment structure of an electric device includes: first and second fitting portions arranged in a hook shape on the bottom of a housing of the electric device and facing each other, the first fitting portion fittingly engaged to one rail edge of the rail in a width direction and the second fitting portion fittingly engaged to the other rail edge of the rail in the width direction; and a linear spring bent in a mountain shape disposed on the bottom of the housing. The linear spring elastically deforms to reduce the inclination angle of the mountain shape by contacting an end surface of the one rail edge engaged to the first fitting portion. The urging force of the linear spring urges the rail such that the other rail edge is pressed by the second fitting portion.

According to the rail attachment structure of the electric device of the embodiment, it is possible to attach or detach an electric device to a rail only by elastically deforming the mountain-shape linear spring to fit and remove the first fitting portion and the second fitting portion.

The rail attachment structure of an electric device according to the above-mentioned embodiment may further include a spring locking portion that is provided on the bottom of the housing and locks a top portion of the mountain-shape linear spring.

According to the rail attachment structure of the electric device of the embodiment, it is possible to elastically deform the linear spring with ease such that the inclination angle of the mountain is reduced.

The rail attachment structure of an electric device according to the above-mentioned embodiment may further include a horizontal deviation preventing portion disposed on the bottom of the housing. A locked portion bent in a concave shape may be arranged on the top portion of the mountain-shape of the linear spring, and the horizontal deviation preventing portion may contact the inside of the locked portion.

According to the rail attachment structure of the electric device of the embodiment, even when external force is applied in the longitudinal direction of the linear spring, the linear spring horizontal deviation preventing portion reliably restricts the movement of the linear spring.

In the rail attachment structure of an electric device according to the above-mentioned embodiment, a pair of the first fitting portions may be separately provided so as to be fittingly engaged to two points of the one rail edge, and the linear spring may be arranged between the pair of first fitting portions such that it can be elastically deformed.

According to the rail attachment structure of the electric device of the embodiment, it is possible to ensure a sufficient space when the linear spring is elastically deformed.

Effects of the Invention

According to the rail attachment structure of the electric device according to the invention, it is possible to attach and detach an electric device to and from a rail only by elastically deforming the mountain-shape linear spring thereby to fit and remove the first fitting portion and the second fitting portion. Therefore, it is possible to simply attach an electromagnetic contactor to a rail with a small number of components and a small number of assembly processes and detach the electromagnetic contactor from the rail without using a tool.

BRIEF DESCRIPTION OF DRAWINGS

FIG. 4 is a diagram illustrating the middle of the operation of attaching the electromagnetic contactor to the rail.

FIG. 5 is a diagram illustrating the completion of the operation of attaching the electromagnetic contactor to the rail.

BEST MODE FOR CARRYING OUT THE INVENTION

Hereinafter, exemplary embodiments (hereinafter, referred to as embodiments) of the invention will be described in detail with reference to the accompanying drawings.

Figure 1:
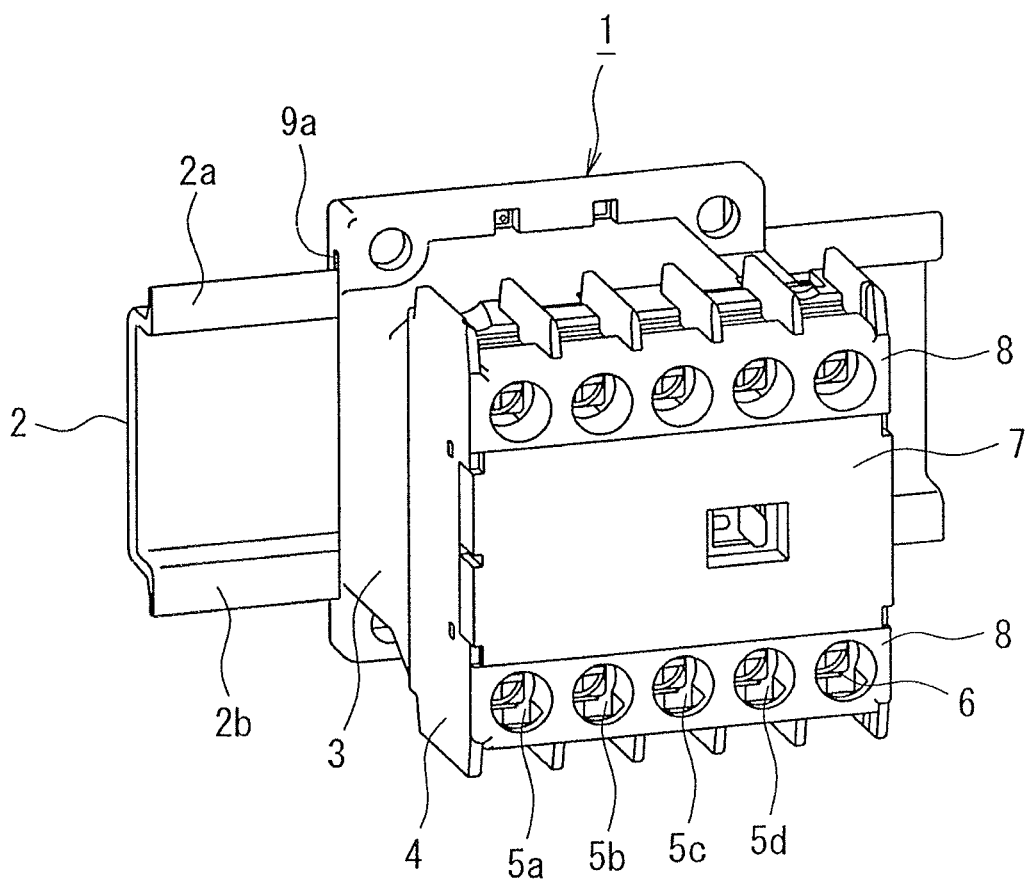
FIG. 1 is a perspective view illustrating an electromagnetic contactor as an electric device attached to a rail.

FIG. 1 is a diagram illustrating an electromagnetic contactor 1 attached to a rail 2 provided on, for example, a distributing board. The rail 2 includes a pair of upper and lower fitting edges 2a and 2b. The edges 2a and 2b extend in parallel to each other. The electromagnetic contactor 1 is engaged to the edges 2a and 2b.

The electromagnetic contactor 1 includes a lower case 3 and an upper case 4 which are made of an insulating synthetic resin material. The upper case 4 includes terminal portions 5a to 5d each having a contact point and a coil terminal 6 of an electromagnet. An arc-extinguishing cover 7 and a terminal cover 8 covering the terminal portions 5a to 5d each having a contact point and the coil terminal 6 of the electromagnet are mounted on the upper case 4.

Figure 2:
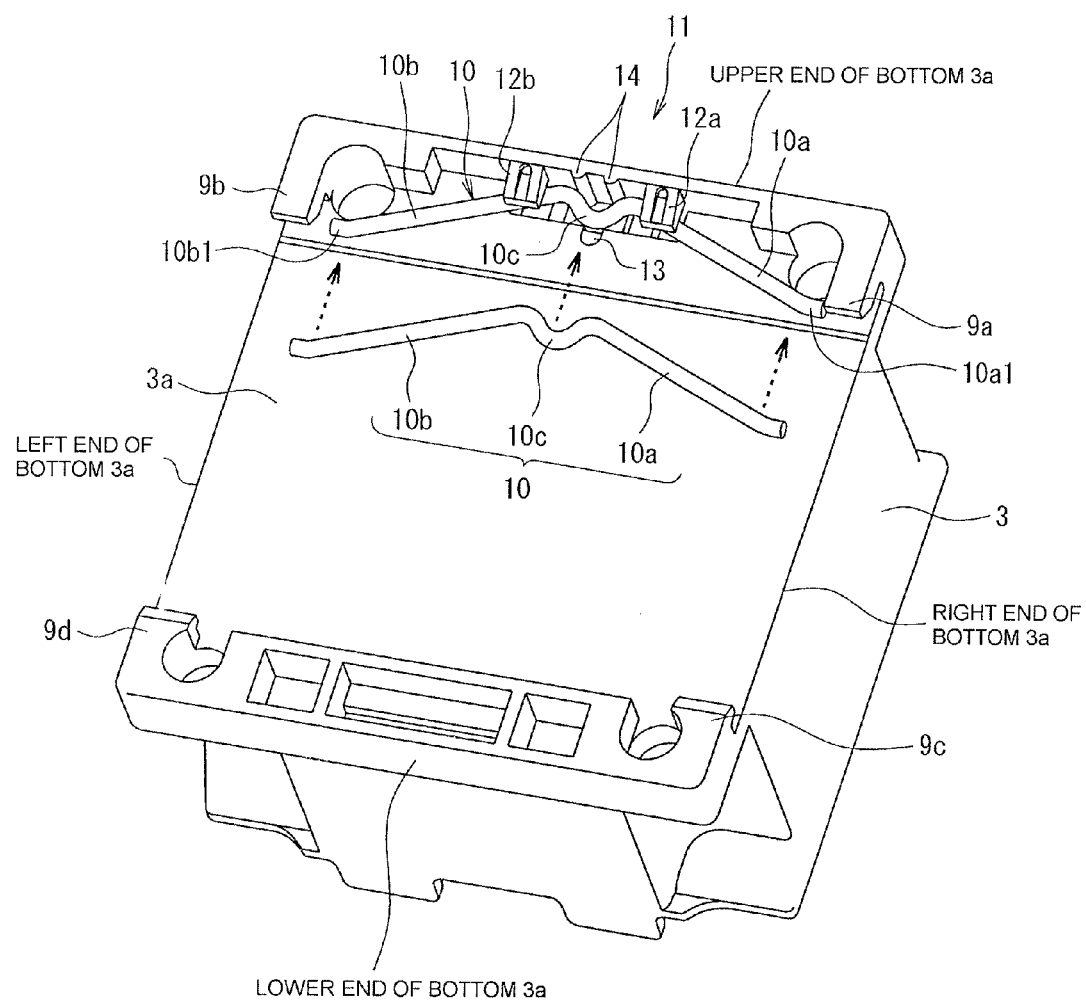
FIG. 2 is a diagram illustrating a linear spring mounted to the bottom of the electromagnetic contactor.

As shown in FIG. 2, first fitting portions 9a and 9b, second fitting portions 9c and 9d, a linear spring 10, and a spring holding portion 11 are provided on the bottom 3a of the lower case 3 of the electromagnetic contactor 1.

That is, the first fitting portions 9a and 9b are formed at the upper left and right ends of the bottom 3a, and the second fitting portions 9c and 9d are formed at the lower left and right ends of the bottom 3a. The first fitting portions 9a and 9b are formed in a hook shape toward the lower end of the bottom 3a so as to have a gap which the upper fitting edge 2a of the rail 2 is inserted. The second fitting portions 9c and 9d are formed in a hook shape toward the upper end of the bottom 3a so as to have a gap which the lower fitting edge 2b of the rail 2 is inserted.

The linear spring 10 is formed by bending an elastic linear member having a diameter of 0.5 mmϕ to 1.5 mmϕ in a mountain shape. As shown in FIG. 2, the linear spring 10 includes a pair of pressing spring portions 10a and 10b extending linearly toward the center in the longitudinal direction while being inclined at the same angle as each other, and a locked portion 10c connected to the pair of pressing spring portions 10a and 10b at the center in the longitudinal direction and bent in a semicircular shape. Both ends of the linear spring 10, which is end portions 10a1 and 10b1 of the pair of pressing spring portions 10a and 10b, are disposed inside the first fitting portions 9a and 9b. Even when the pair of pressing spring portions 10a and 10b is elastically deformed such that the upward inclination thereof is reduced, the end portions 10a1 and 10b1 do not contact the first fitting portions 9a and 9b.

The spring holding portion 11 includes a pair of linear spring sandwiching portions 12a and 12b, a linear spring holding boss 13, and a linear spring horizontal deviation preventing portion 14.

The pair of linear spring sandwiching portions 12a and 12b protrudes in a visor shape from the upper wall portion between the first fitting portions 9a and 9b to the lower end of the bottom 3a. The pair of pressing spring portions 10a and 10b close to the locked portion 10c of the linear spring 10 is interposed and held between the pair of linear spring sandwiching portions 12a and 12b.

The linear spring holding boss 13 is formed so as to protrude from the bottom 3a between the pair of linear spring sandwiching portions 12a and 12b and is engaged to the locked portion 10c of the linear spring 10 from the outside.

The linear spring horizontal deviation preventing portion 14 is a member that protrudes from the upper wall portion between the pair of linear spring sandwiching portions 12a and 12b in a direction perpendicular to the bottom 3a and contact the inside of the locked portion 10c of the linear spring 10 interposed between the pair of linear spring sandwiching portions 12a and 12b.

One rail edge according to the invention corresponds to the upper fitting edge 2a, the other rail edge according to the invention corresponds to the lower fitting edge 2b, a housing according to the invention corresponds to the lower case 3, the bottom of the housing according to the invention corresponds to the bottom 3a, and a spring locking portion according to the invention corresponds to the linear spring sandwiching portions 12a and 12b.

The linear spring 10 according to this embodiment is assembled to the spring holding portion 11 as follows. As shown in FIG. 2, when the linear spring 10 slides to the spring holding portion 11 in the direction of an arrow, the locked portion 10c passes through the linear spring holding boss 13 and the pair of pressing spring portions 10a and 10b close to the locked portion 10c is interposed and held between the pair of linear spring sandwiching portions 12a and 12b. Then, the pair of pressing spring portions 10a and 10b is arranged along the bottom 3a between the first fitting portions 9a and 9b while being bent a little. In this way, the assembly of the linear spring 10 is completed.

Since the linear spring holding boss 13 is engaged to the locked portion 10c of the linear spring 10 from the outside, the falling-off of the linear spring 10 from the pair of linear spring sandwiching portions 12a and 12b is reliably prevented.

In addition, even when external force is applied in the longitudinal direction of the linear spring 10, the movement of the linear spring 10 in the longitudinal direction is restricted since the linear spring horizontal deviation preventing portion 14 contacts the inside of the locked portion 10c of the linear spring 10.

Next, a process of mounting the electromagnetic contactor 1 according to this embodiment to the rail 2 will be described with reference to FIGS. 3 to 5.

Figure 3:
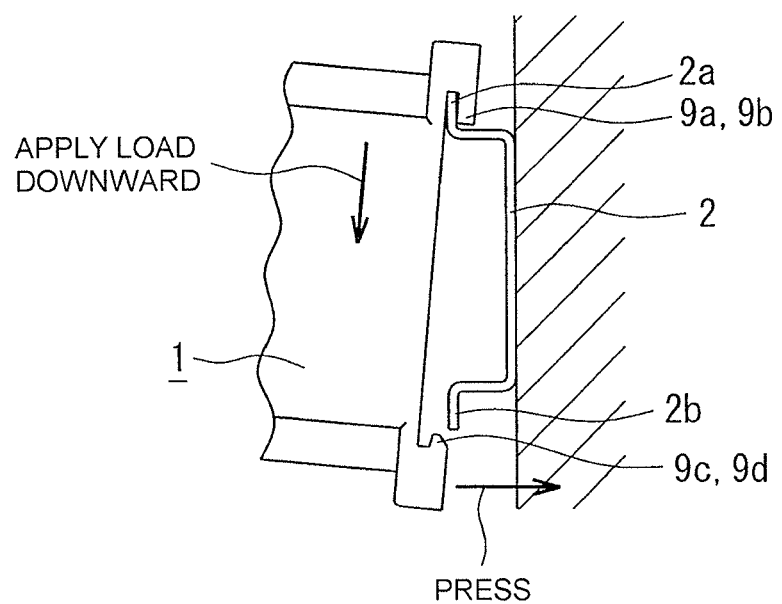
FIG. 3 is a diagram illustrating an initial operation of attaching the electromagnetic contactor to the rail.

First, as shown in FIG. 3, the first fitting portions 9a and 9b are hooked to the upper fitting edge 2a of the rail 2, and a load is applied downward to the electromagnetic contactor 1 to elastically deform the linear spring 10 such that the upward inclination (the inclination angle of the maintain) of the pair of pressing spring portions 10a and 10b contacts the upper fitting edge 2a is reduced. Then, the second fitting protrusions 9c and 9d are pressed against the lower side of the lower fitting edge 2b of the rail 2.

Then, the application of the load to the electromagnetic contactor 1 is released. In this way, as shown in FIG. 4, the urging force of the pair of pressing spring portions 10a and 10b starts applying to the upper fitting edge 2a of the rail 2, and as a result, the electromagnetic contactor 1 gradually moves up. Then, the lower fitting edge 2b of the rail 2 is inserted into the second fitting portions 9c and 9d, as represented by an arrow.

Then, as shown in FIG. 5, in the electromagnetic contactor 1, the first fitting portions 9a and 9b are fitted to the upper fitting edge 2a of the rail 2 and the second fitting portions 9c and 9d are fitted to the lower fitting edge 2b of the rail 2.

The urging force of the pair of pressing spring portions 10a and 10b of the linear spring 10 is applied to the upper fitting edge 2a of the rail 2, and the second fitting portions 9c and 9d press the end surface of the lower fitting edge 2b of the rail 2. In this way, the electromagnetic contactor 1 is mounted to the rail 2.

A tool is unnecessary to detach the electromagnetic contactor 1 from the rail 2. It is possible to detach the electromagnetic contactor 1 from the rail 2 by applying a load downward to the electromagnetic contactor 1 to elastically deform the pair of pressing spring portions 10a and 10b of the linear spring 10 such that the upward inclination thereof is reduced, moving the electromagnetic contactor 1 down, removing the second fitting portions 9c and 9d from the lower fitting edge 2b of the rail 2, and removing the upper fitting edge 2a from the first fitting portion 9a and 9b of the rail 2.

Next, the operation and effect of this embodiment will be described.

According to this embodiment, it is possible to attach and detach the electromagnetic contactor 1 to and from the rail 2 only by arranging the linear spring 10, which is bent in a mountain shape, on the bottom 3a of the lower case 3 and elastically deforming the linear spring 10 to fit or remove the first fitting portions 9a and 9b and the second fitting portions 9c and 9d. Therefore, it is possible to simply attach the electromagnetic contactor 1 with a small number of components and a small number of assembly processes, and detach the electromagnetic contactor 1 from the rail 2 without using a tool.

In the linear spring 10, since the pair of pressing spring portions 10a and 10b close to the locked portion 10c is interposed between the pair of linear spring sandwiching portions 12a and 12b, the pair of pressing spring portions 10a and 10b can be elastically deformed with ease such that the upward inclination (the inclination angle of the mountain) thereof is reduced. Even when external force is applied in the longitudinal direction of the linear spring 10, it is possible to reliably restrict the movement of the linear spring 10 in the longitudinal direction since the linear spring horizontal deviation preventing portion 14 contacts the inside of the locked portion 10c of the linear spring 10.

In addition, both ends (end portions 10a1 and 10b1) of the linear spring 10 are disposed inside the first fitting portions 9a and 9b. Even when the pair of pressing spring portions 10a and 10b is elastically deformed such that the upward inclination thereof is reduced, it is possible to ensure a sufficient space during the deformation of the linear spring 10 since the end portions 10a1 and 10b1 do not contact the first fitting portions 9a and 9b.

Industrial Applicability

As described above, the rail attachment structure of the electric device according to the invention is useful to simply attach an electric device to a rail with a small number of components and a small number of assembly processes.

Explanation of Reference Numerals and Signs

1: electromagnetic contactor
 2: rail
 2a: upper fitting edge
 2b: lower fitting edge
 3: lower case
 3a: bottom
 4: upper case
 5a~5d: terminal portion
 6: coil terminal
 7: arc-extinguishing cover
 8: terminal cover
 9a, 9b: first fitting portion
 9c, 9d: second fitting portion
 10: linear spring
 10a, 10b: pressing spring portion
 10a1, 10b1: end portion of pressing spring portion
 10c: locked portion
 11: spring holding portion
 12a, 12b: linear spring sandwiching portion
 13: linear spring holding boss
 14: horizontal deviation preventing portion

What is claimed is:

1. A rail attachment structure of an electric device for attaching an electric device to a rail, comprising:
    a housing for the electric device, having a bottom, an upper end projecting outwardly from the bottom, and a lower end projecting outwardly from the bottom at a side opposite to the upper end;
    first and second fitting portions arranged in a hook shape on the upper and lower ends of the housing of the electric device and facing each other, the first fitting portion fittingly engaging one rail edge of the rail in a width direction and the second fitting portion fittingly engaging another rail edge of the rail in the width direction;
    a pair of spring locking portions spaced apart from each other and projecting from the upper end toward the lower end to form a space with respect to the bottom; and
    a linear spring bent in a mountain shape disposed on the bottom of the housing and retained by the pair of spring locking portions, the linear spring partially abutting against the upper end of the housing,
    wherein the linear spring elastically deforms to reduce an inclination angle of the mountain shape by contacting an end surface of the one rail edge engaged to the first fitting portion;
    an urging force of the linear spring is applied between the upper end and the rail such that the other rail edge is pressed by the second fitting portion;
    the linear spring further includes a locked portion bent in a concave shape and arranged on a top portion of the mountain-shape linear spring; and
    a horizontal deviation preventing portion is disposed on the upper end between the pair of spring locking portions to project toward the lower end of the housing and is able to contact an inside of the locked portion.

2. A rail attachment structure of an elastic device according to claim 1, further comprising a spring holding boss projecting upwardly from the bottom of the housing at a side opposite to the deviation preventing portion to hold the locked portion between the upper end and the spring holding boss together with the pair of spring locking portion.

3. A rail attachment structure of an elastic device according to claim 2, wherein the upper end and the lower end extend laterally along entire side edge portions of the housing.

4. A rail attachment structure of an elastic device according to claim 2, wherein the linear spring consists of the locked portion bent in the concave shape and a pair of pressing spring portions disposed at two sides of the locked portion to extend laterally and downwardly from the locked portion, respectively.

* * * * *